(12) United States Patent
Döbler

(10) Patent No.: US 6,680,350 B1
(45) Date of Patent: Jan. 20, 2004

(54) MOLDING MATERIALS

(75) Inventor: Martin Döbler, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 34 days.

(21) Appl. No.: 10/070,261

(22) PCT Filed: Aug. 24, 2000

(86) PCT No.: PCT/EP00/08251
§ 371 (c)(1),
(2), (4) Date: Mar. 1, 2002

(87) PCT Pub. No.: WO01/18101
PCT Pub. Date: Mar. 15, 2001

(30) Foreign Application Priority Data

Sep. 6, 1999 (DE) .......................................... 199 42 396

(51) Int. Cl.[7] ................................................. C08K 5/34
(52) U.S. Cl. ........................................................ 524/88
(58) Field of Search ........................................... 524/88

(56) References Cited

U.S. PATENT DOCUMENTS

| 5,397,819 A | 3/1995 | Krutak et al. .................. 524/88 |
| 5,712,332 A | 1/1998 | Kaieda et al. ................. 524/88 |
| 5,788,914 A | 8/1998 | Oi et al. ..................... 252/587 |

FOREIGN PATENT DOCUMENTS

| EP | 0 510 958 | 10/1992 |
| EP | 0 607 031 | 7/1994 |
| EP | 0 767 221 | 4/1997 |
| JP | 6-240146 | 8/1994 |

OTHER PUBLICATIONS

Chem. Rev. (month unavailable) 1992, 92, pp. 1197–1226, Jürgen Fabian, "Near–Infrared Absorbing Dyes".

Database WPI, Section Ch, Week 199742, Derwent Publications Ltd., London, GB; Class A60, An 1997–402573, XP002157753 & JP 09 208840 A (Kureha Kagaku Kogyo KK), Aug. 12, 1997, Zusammenfasssung & WO 97 28212 A (Kureha) Aug. 7, 1997.

*Primary Examiner*—Kriellion A. Sanders
(74) *Attorney, Agent, or Firm*—Joseph C. Gil; Aron Preis

(57) ABSTRACT

A molding composition suitable for the preparation of glazing is disclosed. The composition contains a transparent thermoplastic polymer and a phthalocyanine or naphthalocyanine. Also disclosed is a method for preparing the composition.

9 Claims, No Drawings

MOLDING MATERIALS

This Application is a 371 of PCT/EP 00/08251 Aug. 24, 2000.

The present invention relates to moulding compositions of transparent thermoplastic polymers and phthalocyanines or naphthalocyanines, the production and use thereof and products made from these moulding compositions, especially glazing made of these moulding compositions.

When transparent thermoplastic polymers, especially polycarbonate, are used in motor vehicles, buildings or in similar applications, e.g. for glazing, the high heat transmission under insolation, i.e. the high transmission of near infrared light, leads to undesirable heating up of the interior.

As described for example in Parry Moon, Journal of the Franklin Institute, volume 230, pages 583–618 (1940), the majority of solar energy apart from the visible range of light between 400 and 650 nm lies in the near infrared (NIR) range between 650 and 1100 nm. The conventional transparent thermoplastic polymers, especially polycarbonate, are highly transparent both in the visible range and in the NIR. These therefore lead to the above-mentioned disadvantages when used as glazing material.

The addition of suitable NIR absorbers to transparent thermoplastic polymers could lead to glazing materials without these disadvantages.

Glazing materials are needed which, while having the highest possible transparency in the visible range of the spectrum, have the lowest possible transparency in the NIR Inorganic NIR absorbers are known in the literature. However, owing to their low compatibility with transparent thermoplastics, these lead to very cloudy mouldings which are unsuitable as glazing for many applications.

Organic NIR absorbers are also known in the literature, e.g. in B. J. Fabian, H. Nakazumi, H. Matsuoka, Chem. Rev. 92, 1197 (1992).

For the above applications, high long-term light resistance is also necessary for exterior applications, together with good processability without decomposition of the polymer matrix and without the release of foul-smelling gases in industrial-scale production. In addition, for ecological and legal reasons, halogen-free NIR absorbers and naphthalocyanines should be used if possible.

NIR absorbers with high lightfastness are e.g. phthalocyanines and naphthalocyanines. However, in addition to absorption in the NIR, conventional phthalocyanines and naphthalocyanines also display high absorption in the visible light range. This is undesirable for many applications. Moreover, many phthalocyanines and naphthalocyanines are not sufficiently miscible with transparent thermoplastic polymers, especially polycarbonate, for non-cloudy mouldings to be formed.

Up to now, only phthalocyanines and naphthalocyanines with N, S or halogen-containing side groups have been known which have their maximum absorption at more than 700 nm and form non-cloudy moulding compositions with polycarbonate.

In EP-A 767221, for example, phthalocyanines are described which have aminofunctional side groups in order to improve solubility. However, additives with amino groups or amide groups can lead to degradation of the molecular weight of polycarbonate and other transparent thermoplastic polymers. Phthalocyanines and naphthalocyanines without groups of this type should therefore be used.

In JP-A 06 240 146, phthalocyanines are described which have sulfur-containing substituents. When these compounds are processed on an industrial scale, however, sulfur-containing decomposition products can occur, which are usually foul smelling and toxic. Sulfur-containing additives should therefore be avoided.

In U.S. Pat. No. 5,712,332, fluorine-containing phthalocyanines are described which absorb in the NIR For ecological and legal reasons, however, halogen-free moulding compositions should be developed.

The present invention is therefore based on the object of providing moulding compositions which are suitable as glazing materials for motor vehicles and buildings and which are highly trasparent in the visible light range and have low transparency for NIR.

The object according to the invention is achieved by moulding compositions containing a) a transparent thermoplastic polymer and
b) 0.1 ppm to 1 wt. %, based on the mass of the transparent thermoplastic polymer, of a phthalocyanine of the general formula (I)

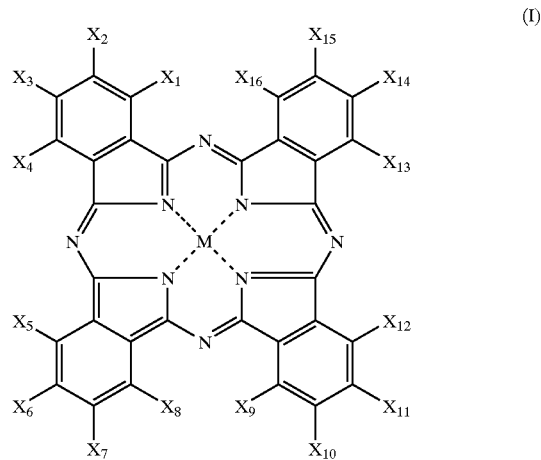

wherein

M is any atom or any compound, preferably VO, Cu, Al, Zn, Ni, 2 hydrogen atoms, $SiR_2$, AlR, Mg, Fe, GaR, MnR, SnR, 2 sodium atoms, 2 lithium atoms, 2 potassium atoms or TiO, particularly preferably VO or Cu, and R is an aliphatic radical, an aromatic radical, an alkoxy radical or an aryloxy radical, preferably one without N, S or halogen atoms and particularly preferably one without N, S or halogen atoms and with 1 to 30, preferably 1 to 10, C atoms and $X_1$ to $X_{16}$, independently of one another, are hydrogen, an aliphatic radical, an aromatic radical, an alkoxy radical or an aryloxy radical, wherein none of these radicals contains any N atoms, S atoms or halogen atoms and wherein at least one of the substituents $X_1$ to $X_{16}$, in particular at least four of the substituents $X_1$ to $X_{16}$, is not hydrogen, preferably hydrogen, an aliphatic radical, an aromatic radical, an alkoxy radical or an aryloxy radical, wherein none of these radicals contains any N, S or halogen atoms and wherein at least one of the substituents $X_1$ to $X_{16}$, in particular at least four of the substituents $X_1$ to $X_{16}$, is not hydrogen, and wherein all these radicals which are not hydrogen contain 1 to 30 C atoms, preferably 1 to 10 C atoms, and particularly preferably hydrogen, an aliphatic radical, an aromatic radical, an alkoxy radical or an aryloxy radical, wherein none of these radicals contains any N, S or halogen atoms and wherein at least one of the substituents $X_1$ to $X_{16}$, in particular at least four of the substituents $X_1$ to $X_{16}$, is not hydrogen, and wherein all these radicals which are not hydrogen contain 1 to 10 C atoms, and wherein these radicals which are not hydrogen are bulky radicals, such as e.g. tert.-butyl, phenoxy or phenyl radicals, or a naphthalocyanine of the general formula (II)

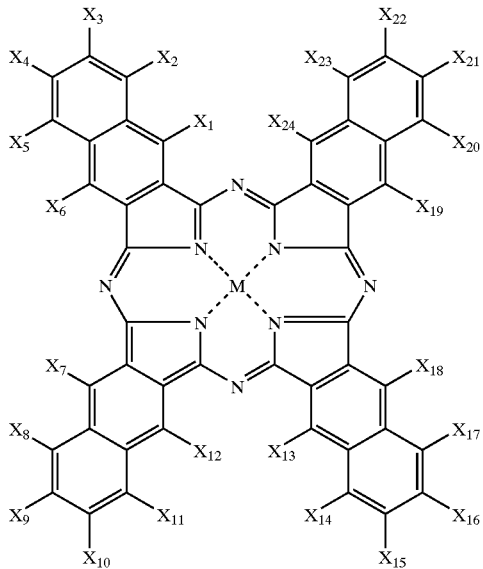

(II)

wherein

M is any atom or any compound, preferably VO, Cu, Al, Zn, Ni, 2 hydrogen atoms, $SiR_2$, AlR, Mg, Fe, GaR, MnR, SnR, 2 sodium atoms, 2 lithium atoms, 2 potassium atoms or TiO, particularly preferably VO or Cu, and R is an aliphatic radical, an aromatic radical, an alkoxy radical or an aryloxy radical, preferably one without N, S or halogen atoms and particularly preferably one without N, S or halogen atoms and with 1 to 30, preferably 1 to 10, C atoms, and $X_1$ to $X_{24}$, independently of one another, are hydrogen, an aliphatic radical, an aromatic radical, an alkoxy radical or an aryloxy radical, wherein none of these radicals contains any N, S or halogen atoms and wherein at least one of the substituents $X_1$ to $X_{24}$, in particular at least four of the substituents $X_1$ to $X_{24}$, is not hydrogen, preferably hydrogen, an aliphatic radical, an aromatic radical, an alkoxy radical or an aryloxy radical, wherein none of these radicals contains any N, S or halogen atoms and wherein at least one of the substituents $X_1$ to $X_{24}$, in particular at least four of the substituents $X_1$ to $X_{24}$, is not hydrogen, and wherein all these radicals which are not hydrogen contain 1 to 30 C atoms, preferably 1 to 10 C atoms, and particularly preferably hydrogen, an aliphatic radical, an aromatic radical, an alkoxy radical or an aryloxy radical, wherein none of these radicals contains any N, S or halogen atoms and wherein at least one of the substituents $X_1$ to $X_{24}$, in particular at least four of the substituents $X_1$ to $X_{24}$, is not hydrogen, and wherein all these radicals which are not hydrogen contain 1 to 10 C atoms, and wherein these radicals which are not hydrogen are bulky radicals, such as e.g. tert.-butyl, phenoxy or phenyl radicals, and by the production thereof, by the use thereof and by products made from these moulding compositions.

Particularly preferred phthalocyanines are copper(II) 1,4,8,11,15,18,22,25-octabutoxy-29H,31H-phthalocyanine or vanadyl 2,9,16,23-tetraphenoxy-29H,31H-phthalocyanine.

The phthalocyanines according to the invention are preferably used in concentrations of 0.1 ppm to 1 wt. %, particularly preferably between 1 ppm and 0.1 wt. % and especially preferably between 30 ppm and 200 ppm, based on the mass of the transparent thermoplastic polymer.

Particularly preferred naphthalocyanines are vanadyl 5,14,23,32-tetraphenyl-2,3-naphthalo-cyanine and vanadyl 2,11,20,29-tetra-tert-butyl-2,3-naphthalocyanine.

The naphthalocyanines according to the invention are preferably used in concentrations of 0.1 ppm to 1 wt. %, particularly preferably between 1 ppm and 0.1 wt. % and especially preferably between 30 ppm and 200 ppm, based on the mass of the transparent thermoplastic polymer.

The moulding compositions according to the invention can also contain mixtures of different phthalocyanines of the general formula (I) and/or different naphthalocyanines of the general formula (II).

Mixtures of more than one each of naphthalocyanines and phthalocyanines which have their maximum absorptions at very different wavelengths in the NIR are particularly preferred. These allow the largest possible range of the NIR to be covered for the heat filter. Optimisation can be carried out by the person skilled in the art.

The NIR absorbers according to the invention can be produced by known methods. These are described e.g. in "Phthalocyanines and Related Compounds", Hanack, Heckmann and Polley, Houben-Weyl, vol. E9d, pages 717 to 824, Thieme Verlag, Stuttgart, 1998. Some of them are commercially available.

Polycarbonate, polymethyl methacrylate, polystyrene, polyethylene terephthalate, glycol-modified polyethylene terephthalate, polyvinyl chloride and transparent polyolefins, such as can be produced e.g. by metallocene-catalysed polymerisation, are suitable as transparent thermoplastics. Polycarbonate is particularly preferred.

Any polycarbonate can be used according to the invention.

Polycarbonates that are suitable according to the invention are both homopolycarbonates and copolycarbonates. A mixture of the polycarbonates that are suitable according to the invention can also be used.

The polycarbonates can be partially or completely replaced by aromatic polyester carbonates.

The polycarbonates can also contain polysiloxane blocks. The production thereof is described e.g. in U.S. Pat. No. 3,821,325, U.S. Pat. No. 3,189,662 and U.S. Pat. No. 3,832,419.

Preferred polycarbonates are those homopolycarbonates and copolycarbonates based on bisphenols of the general formula (III),

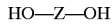 HO—Z—OH (III)

wherein Z is a divalent organic radical with 6 to 30 C atoms, which contains one or more aromatic groups.

Examples of bisphenols according to the general formula (III) are bisphenols belonging to the following groups:

dihydroxydiphenyls, bis(hydroxyphenyl)alkanes, bis(hydroxypheny)cycloalkanes,
indane bisphenols,
bis(hydroxyphenyl)sulfides,
bis(hydroxyphenyl)ethers,
bis(hydroxyphenyl)ketones,
bis(hydroxyphenyl)sulfones,
bis(hydroxyphenyl)sulfoxides and
α,α'-bis(hydroxyphenyl)diisopropylbenzenes.

Derivatives of the above bisphenols, which are obtainable for example by alkylation or halogenation on the aromatic rings of the above bisphenols, are also examples of bisphenols according to the general formula (III).

Examples of bisphenols according to the general formula (III) are especially the following compounds:

hydroquinone,
resorcinol,
4,4'-dihydroxydiphenyl,
bis(4-hydroxyphenyl)sulfide,
bis(4-hydroxyphenyl)sulfone,
bis(3,5-dimethyl-4-hydroxyphenyl)methane,
bis(3,5-dimethyl-4-hydroxyphenyl)sulfone,
1,1-bis(3,5-dimethyl-4-hydroxyphenyl)-p/m-iisopropylbenzene,
1,1-bis(4-hydroxyphenyl)-1-phenylethane,
1,1-bis(3,5-dimethyl-4-hydroxyphenyl)cyclohexane,
1,1-bis(4-hydroxyphenyl)-3-methylcyclohexane,
1,1-bis(4-hydroxyphenyl)-3,3-dimethylcyclohexane,
1,1-bis(4-hydroxyphenyl)-4-methylcyclohexane,
1,1-bis(4-hydroxyphenyl)cyclohexane,
1,1-bis(4-hydroxyphenyl)-3,3,5-trimethylcyclohexane,
2,2-bis(3,5-dichloro-4-hydroxyphenyl)propane,
2,2-bis(3-methyl-4-hydroxyphenyl)propane,
2,2-bis(3,5-dimethyl-4-hydroxyphenyl)propane,
2,2-bis(4-hydroxyphenyl)propane (i.e. bisphenol A),
2,2-bis(3-chloro-4-hydroxyphenyl)propane,
2,2-bis(3,5-dibromo-4-hydroxyphenyl)propane,
2,4-bis(4-hydroxyphenyl)-2-methylbutane,
2,4-bis(3,5-dimethyl-4-hydroxyphenyl)-2-methylbutane,
α,α'-bis(4-hydroxyphenyl)-o-diisopropylbenzene,
α,α'-bis(4-hydroxyphenyl)-m-diisopropylbenzene (i.e. bisphenol M),
α,α'-bis(4-hydroxyphenyl)-p-diisopropylbenzene and
indane bisphenol.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

The bisphenols according to general formula (III) described can be produced by known methods, e.g. from the corresponding phenols and ketones.

The above bisphenols and methods of producing them are described e.g. in the monograph H. Schnell, "Chemistry and Physics of Polycarbonates", Polymer Reviews, vol. 9, p. 77–98, Interscience Publishers, New York, London, Sidney, 1964 and in U.S. Pat. No. 3,028,635, U.S. Pat. No. 3,062, 781, U.S. Pat. No. 2,999,835, U.S. Pat. No. 3,148,172, U.S. Pat. No. 2,991,273, U.S. Pat. No. 3,271,367, U.S. Pat. No. 4,982,014, U.S. Pat. No. 2,999,846, DE-A 1 570 703, DE-A 2 063 050, DE-A 2 036 052, DE-A 2 211 956, DE-A 3 832 396 and FR-A 1 561 518 and in the Japanese published patent applications with the application numbers 62039/1986, 62040/1986 and 105550/1986.

1,1-Bis(4-hydroxyphenyl)-3,3,5-trimethylcyclohexane and the production thereof are described e.g. in U.S. Pat. No. 4,982,014.

Indane bisphenols and the production thereof are described e.g. in U.S. Pat. No. 3,288,864, JP-A 60 035 150 and U.S. Pat. No. 4,334,106. Indane bisphenols can be produced e.g. from isopropenyl-phenol or the derivatives thereof or from dimers of isopropenylphenol or the derivatives thereof in the presence of a Friedel-Crafts catalyst in organic solvents.

Polycarbonates can be produced by known methods. Suitable methods of producing polycarbonates are, for example, production from bisphenols with phosgene by the phase boundary process or from bisphenols with phosgene by the homogeneous phase process, the socalled pyridine process, or from bisphenols with carbonates by the melt transesterification process. These production methods are described e.g. in H. Schnell, "Chemistry and Physics of Polycarbonates", Polymer Reviews, vol. 9, p. 31–76, Interscience Publishers, New York, London, Sidney, 1964. The above production methods are also described in D. Freitag, U. Grigo, P. R. Müller, H. Nouvertne, "Polycarbonates" in Encyclopedia of Polymer Science and Engineering, volume 11, second edition, 1988, pages 648 to 718 and in U. Grigo, K. Kircher, and P. R. Müller "Polycarbonate" in Becker, Braun, Kunststoff-Handbuch, vol. 3/1, Polycarbonate, Poyacetale, Polyester, Celluloseester, Carl Hanser Verlag Munich, Vienna 1992, pages 117 to 299 and in D. C. Prevorsek, B. T. Debona and Y. Kesten, Corporate Research Center, Allied Chemical Corporation, Morristown, N.J. 07960, "Synthesis of Poly(estercarbonate) Copolymers" in Journal of Polymer Science, Polymer Chemistry Edition, vol. 19, 75–90 (1980).

The melt transesterification process is particularly described in H. Schnell, "Chemistry and Physics of Polycarbonates", Polymer Reviews, vol. 9, p. 44–51, Interscience Publishers, New York, London, Sidney, 1964 and in DE-A 1 031 512, U.S. Pat. No. 3,022,272, U.S. Pat. No. 5,340,905 and U.S. Pat. No. 5,399,659.

In the production of polycarbonate, raw materials and auxiliary substances with a low level of impurities are preferably used. In the case of production by the melt transesterification process in particular, the bisphenols and carbonic acid derivatives used should, as far as possible, be free from alkali ions and alkaline earth ions. Raw materials of such purity are obtainable, for example, by recrystallising, washing or distilling the carbonic acid derivatives, e.g. carbonates, and the bisphenols.

In the production of polycarbonates by the melt transesterification process, the reaction of the bisphenol and the carbonic acid diester can be carried out continuously or batchwise, e.g. in stirred vessels, thin layer evaporators, falling-film evaporators, stirred vessel cascades, extruders, kneaders, simple disk reactors and high-viscosity disk reactors.

Carbonic acid diesters that can be used to produce polycarbonates are, for example, diaryl esters of carbonic acid, the two aryl radicals preferably having 6 to 14 C atoms each. The diesters of carbonic acid based on phenol or alkyl-substituted phenols are preferably used, e.g. diphenyl carbonate or dicresyl carbonate. Based on 1 mol bisphenol, the carbonic acid diesters are preferably used in a quantity of 1.01 to 1.30 mol, particularly preferably in a quantity of 1.02 to 1.15 mol.

The polycarbonates that are suitable according to the invention preferably have a weight average molecular weight ($M_w$), which can be determined e.g. by ultracentrifigation or nephelometry, of 10 000 to 200 000 g/mol. They particularly preferably have a weight average molecular weight of 12 000 to 80 000 g/mol.

The average molecular weight of the polycarbonates according to the invention can be adjusted by a known method e.g. by means of an appropriate quantity of chain terminators. The chain terminators can be used individually or as a mixture of various chain terminators.

Suitable chain terminators are both monophenols and monocarboxylic acids. Suitable monophenols are e.g. phenol, p-chlorophenol, p-tert.-butylphenol, cumylphenol or 2,4,6-tribromophenol, and long-chain alkylphenols such as e.g. 4-(1,1,3,3-tetramethylbutyl)phenol or monoalkylphenols or dialkylphenols with a total of 8 to 20 C atoms in the alkyl substituents such as e.g. 3,5-di-tert.-butylphenol, p-tert.-octylphenol, p-dodecylphenol, 2-(3,5-dimethylheptyl)phenol or 4-(3,5-dimethylheptyl)phenol. Suitable monocarboxylic acids are benzoic acid, alkylbenzoic acids and halobenzoic acids.

Preferred chain terminators are phenol, p-tert.-butylphenol, 4-(1,1,3,3-tetramethylbutyl)phenol and cumylphenol.

The quantity of chain terminators is preferably between 0.25 and 10 mol %, based on the sum of the bisphenols used in each case.

The polycarbonates that are suitable according to the invention can be branched by a known method, preferably by the incorporation of trifunctional or more than trifunctional branching agents. Suitable branching agents are e.g. those with three or more phenolic groups or those with three or more carboxylic acid groups.

Suitable branching agents are e.g. phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)-benzene, 1,1,1-tris(4-hydroxyphenyl)ethane, tri(4-hydroxyphenyl)phenylmethane, 2,2-bis-[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-di-hydroxyphenyl)propane, hexa(4-(4-hydroxyphenylisopropyl)phenyl) terephthalate, tetra(4-hydroxyphenyl)methane, tetra(4-(4-hydroxyphenylisopropyl)phenoxy)methane and 1,4-bis-(4',4"-dihydroxytriphenyl)methylbenzene and 2,4-dihydroxybenzoic acid, trimesic acid, cyanuric chloride, 3,3-bis(3-methyl-4-hydroxyphenyl)-2-oxo-2,3-dihydroindole, trimesic acid trichloride and α,α',α"-tris(4-hydroxyphenol)-1,3,5-triisopropylbenzene.

Preferred branching agents are 1,1,1-tris(4-hydroxyphenyl)ethane and 3,3-bis(3-methyl-4-hydroxyphenyl)-2-oxo-2,3-dihydroindole.

The quantity of the branching agents optionally to be used is preferably 0.05 mol % to 2 mol %, based on mol of bisphenols used.

In the case of the production of polycarbonate by the phase boundary process, for example, the branching agents can be placed in the initial aqueous alkaline phase with the bisphenols and the chain terminators, or dissolved in an organic solvent and added together with the carbonic acid derivatives. In the case of the transesterification process, the branching agents are preferably added together with the dihydroxyaromatics or bisphenols.

Other polymers can be mixed in with the polycarbonates according to the invention, resulting in so-called polymer blends. For example, blends of the polycarbonates according to the invention and ABS polymers or of the polycarbonates according to the invention and polyesters, such as e.g. polyethylene terephthalate or polybutylene terephthalate, can be produced. The composition of the blends should be such that they are transparent.

The moulding compositions according to the invention are suitable for the production of glazing which can be used as heat filters by absorbing IR radiation. At the same time, they are transparent in the visible light range. They have high long-term resistance to environmental influences, such as e.g. UV radiation.

The moulding compositions according to the invention have the advantage that they are non-cloudy and that they have high transparency in the visible light range and low transparency in the NIR. Moreover, the advantageous properties of the unmodified transparent thermoplastic polymer, especially polycarbonate, remain, such as e.g. high lightfastness, low cloud and good mechanical properties.

The moulding compositions according to the invention do not have the disadvantages brought about by the addition of amino groups, amide groups, sulfur-containing groups or halogen-containing groups.

Optionally, mixtures of one or more phthalocyanines or naphthalocyanines with other NIR absorbers known from the literature can also be used. In addition, mixtures with conventional dyes which absorb in the visible range can also be used to produced a desired shade. The methods of achieving this are known to the person skilled in the art. These dyes can be used e.g. in concentrations of 0.1 ppm to 1%, preferably between 1 ppm and 0.1% and particularly preferably between 30 and 200 ppm.

To modify the properties, conventional additives can be incorporated in the moulding compositions according to the invention and/or applied to the surface. Conventional additives are e.g. fillers (e.g. mineral fillers), reinforcing materials (e.g. glass fibres), stabilisers (e.g. UV stabilisers, heat stabilisers, gamma radiation stabilisers), antistatic agents, flow promoters, mould release agents, flame retardants, dyes and pigments. The above and other suitable additives are described e.g. in Gächter, Müller, Kunststoff-Additive, $3^{rd}$ edition, Hanser-Verlag, Munich, Vienna, 1989.

Optionally, other additives can be used such as e.g. the flame retardants, fillers, foaming agents, dyes, pigments, optical brighteners and nucleating agents or several described in EP 0 839.623 and EP-A 0 500 496, preferably in quantities of up to 5 wt. % each, preferably 0.01 to 5 wt. %, based on the total mixture, particularly preferably 0.01 wt. % to 1 wt. % based on the mass of the thermoplastic transparent polymer. Mixtures of these additives are also suitable.

The moulding compositions according to the invention can also contain other NIR absorbers.

The phthalocyanines or naphthalocyanines according to the invention and optionally the other additives can be incorporated into the transparent thermoplastic polymer e.g. by means of an extruder. The transparent thermoplastic polymer is preferably melted in this process.

Suitable UV absorbers and antioxidants according to the invention, which can be added to the moulding compositions according to the invention as additional additives, are described e.g. in EP-A 0 839 623, WO 96/15102 and EP-A 0 500 496.

Particularly suitable as UV absorbers are benzotriazoles, triazines, benzophenones and other compounds such as e.g. arylated cyanoacrylates.

Particularly preferred are hydroxybenzotriazoles, such as e.g. 2-(3',5'-bis(1,1-dimethylbenzyl)-2'-hydroxyphenyl) benzotriazole (Tinuvin® 234, Ciba Spezialitätenchemie, Basel), Tinuvin® 326 Fla. (CAS 2895-11-5) (Ciba Spezialitätenchem, Basel), 2-(2'-hydroxy-5'-tert-octyl)phenyl) benzotriazole (Tinuvin® 329, Ciba Spezialitätenchemie, Basel), 2-(2'-hydroxy-3'-(2-butyl)-5'-(tert-butyl)phenyl)

benzotriazole (Tinuvin® 350, Ciba Spezialitätenchemie, Basel), bis(3-(2H-benzotriazolyl)-2-hydroxy-5-tert-octyl) methane, (Tinuvin® 360, Ciba Spezialitätenchemie, Basel), 2-(4-hexoxy-2-hydroxyphenyl)-4,6-diphenyl-1,3,5-triazine (Tinuvin® 1577, Ciba Spezialitätenchemie, Basel), and the benzophenone 2,4-dihydroxybenzophenone (Chimasorb22®, Ciba Spezialitätenchemie Basel).

The UV absorbers are preferably used in quantities of between 0.001 wt. % and 10 wt. % each, preferably 0.01 wt. % and 1 wt. %, preferably between 0.1 and 1 wt. % and particularly preferably between 0.2 and 0.6 wt. %.

Particularly suitable as antioxidants (also known as heat stabilisers) are phosphites, hindered phenols, aromatic, aliphatic or mixed phosphines, lactones, thioethers and hindered amines (HALS), and optionally, some of the heat stabilisers can naturally also be present in an oxidised form.

Particularly preferred are triphenylphosphine, tris(2-ethylhexyl) phosphate (TOF), triphenylphosphine, tetrakis (2,4-di-tert-butylphenyl)-4,4'-biphenylene diphosphonite (Irgafos® PEPQ), octadecyl-3-(3',5'-di-tert-butyl-4'-hydroxyphenyl)propionate (Irganox® 1076), tris(2,4-di-tert-butylphenyl) phosphite (Irgafos® 168), and Anox® TB123 (mixture of octadecyl-3-(3',5'-di-tert-butyl-4'-hydroxyphenyl)propionate, tris(2,4-di-tert-butylphenyl) phosphite and distearyl-3,3'-thiodipropionate) (a product of the Great Lakes Chemical Corp., Lafayette, Ind., USA) Anox® TB331 (a mixture of tris(2,4-di-tert-butyl-4-hydroxyhydrocinnamate)methane, tris(2,4-di-tert-butylphenyl) phosphite and distearyl-3,3'-thiodipropionate) (a product of the Great Lakes Chemical Corp., Lafayette, Ind., USA), and Irganox® HP2921 (a mixture of octadecyl-3-(3',5'-di-tert-butyl-4'-hydroxyphenyl)-propionate, tris(2,4-di-tert-butylphenyl) phosphite and 5,7-di-tert-butyl-3-(3,4-dimethyl-phenyl)-3H-benzofuran-2-one (Irganox® HP136, Ciba Spezialitätenchemie, Basel).

The above UV absorbers and antioxidants are used individually or in any mixtures, in concentrations of 1 ppm–10 wt. %, and the addition can take place in substance, as a powder or melt, or else as a solution, before or during work-up, but also in a subsequent compounding step.

The moulding compositions according to the invention can be processed into mouldings e.g. by extruding the moulding compositions into granules and processing these granules into various articles in a known manner, after the optional addition of the above-mentioned additives, by injection moulding or extrusion.

The moulding compositions according to the invention can be universally used as transparent mouldings where heat transmission is undesirable. Application in automotive components or for buildings is particularly suitable, e.g. as glazing elements or plastic diffusers for car headlights. Application in extruded sheets is also particularly suitable, e.g. solid sheets, cavity sheets, twin-wall sheets or multi-wall sheets, optionally also with one or more co-extruded layers, and application in injection-moulded parts, such as foodstuffs containers, components of electrical appliances and in spectacle lenses, including e.g. for protective goggles, in optical data storage media or in heat filters.

The moulding compositions according to the invention are also suitable for the labelling of plastics for recycling or sorting purposes. The phthalocyanine or naphthalocyanine acts as an identifying feature, which can be recognised e.g. by its absorption spectrum.

EXAMPLES

To prepare the test pieces, an additive-free, unstabilised, bisphenol A polycarbonate (Makrolon® 3208 from Bayer AG, Leverkusen) with an average molecular weight of approx. 32 000 ($M_w$ by GPC), solution viscosity: η=1.32 (0.5 g/l methylene chloride, 20° C.), was compounded at 300° C. on an extruder with the stated quantity of additive and then granulated. These granules were then made into colour test plates by injection moulding (76 mm×50 mm×2.5 mm). The examples are compiled in Table 1. The cloud was determined by ASTM specification D 1003.

TABLE 1

| No. | Composition | Cloud [%] |
| --- | --- | --- |
| Example 1 | Makrolon ® 3208 with 157 ppm vanadyl 5,14,23,32-tetraphenyl-2,3-naphthalocyanine, 0.5% Tinuvine ® 326 FL (Ciba), 0.5% Irganox ® 1076 (Ciba), 0.5% Irgafos ® 168 (Ciba) | 0.58% |
| Example 2 | Makrolon ® 3208 with 103 ppm vanadyl 2,11,20,29-tetra-tert-butyl-2,3-naphthalocyanine, 0.5% Tinuvin ® 326 FL, 0.5% Irganox ® 1076, 0.5% Irgafos ® 168 | 1.09% |
| Example 3 | Makrolon ® 3208 with 109 ppm copper(II) 1,4,8,11,15,18,22,25-octabutoxy-29H,31H-phthalocyanine, 0.5% Tinuvin ® 326 FL, 0.5% Irganox ® 1076, 0.5% Irgafos ® 168 | 0.59% |
| Example 4 | Makrolon ® 3208 with 102 ppm vanadyl 2,9,16,23-tetraphenoxy-29H,31H-phthalocyanine, 0.25% Tinuvin ® 234 (Ciba) | 0.59% |
| Example 5 | Makrolon ® 3208 with 69 ppm vanadyl 5,14,23,32-tetraphenyl-2,3-naphthalocyanine, 72 ppm copper(ll) 1,4,8,11,15,18,22,25-octabutoxy-29H,31H-phthalocyanine, 0.5% Tinuvin ® 326 FL, 0.5% Irganox ® 1076, 0.5% Irgafos ® 168 | 0.53% |
| Example 6 | Makrolon ® 3208 with 68 ppm vanadyl 5,14,23,32-tetraphenyl-2,3-naphthalocyanine, 72 ppm copper(ll) 1,4,8,11,15,18,22,25-octabutoxy-29H,31H-phthalocyanine, 38 ppm vanadyl 2,9,16,23-tetraphenoxy-29H,31H-phthalocyanine, 0.27% Tinuvin ® 234 | 1.01% |
| Comparative Example 1 | Makrolon ® 3208 with 0.5% Tinuvin ® 326 FL, 0.5% Irgafos ®1076, 0.5% Irgafos ® 168 | 0.93% |
| Comparative Example 2 | Makrolon ® 3208 with 157.5 ppm vanadyl(IV) 3,10,17,24-tetra-tert-butyl-1,8,15,22-tetrakis(dimethylamino)-29H,31H-phthalocyanine (Aldrich), 0.5% Tinuvin ® 326 FL, 0.5% Irganox ® 1076, 0.5% Irgafos ® 168 | 1.18% |
| Comparative Example 3 | Makrolon ® 3208 with 28 ppm Excolor ® 803 K (Nippon Shokubai), 0.25% Tinuvin ® 234 | Not measured |

As shown in Table 1, the moulding compositions with naphthalocyanines and phthalocyanines investigated exhibit low cloudiness.

TABLE 2

Solution viscosity of colour test plates in methylene chloride (0.5 g/l methylene chloride, 20° C.).

| Sample | Solution viscosity |
|---|---|
| Comparative example 1 | 1.292 |
| Example 2 | 1.301 |
| Comparative example 2 | 1.270 |

Table 2 clearly shows that the moulding of comparative example 2, which contains the amino group-containing phthalocyanine, has a significantly lower viscosity than the undyed Makrolon (comparative example 1) or the one to which amino group-free NIR dye has been added (example 2). This is evidence of degradation of the polymer matrix by this amino group-containing dye.

As a measure of transmittance in the visible light range, the TLT value (total luminous transmittance) was determined; as a measure of transmittance of the total solar energy, the TSET value (total solar energy transmittance). The aim is therefore to obtain the lowest possible TSET value with, at the same time, the highest possible TLT value. The trasmission spectra were measured with a conventional UV-VIS-NIR spectrophotometer, "lamda 9" from Perkin Elmer. The TSET value was determined from these by the Parry Moon method. In addition, the TLT value was determined in accordance with SAE J1796. The TLT and TSET values obtained from examples 1–7 are listed in Table 3.

The TSET value is calculated by the Parry Moon method using the following formula:

$$TSET=\Sigma_\lambda G_\lambda T_{sample}(\lambda)/\Sigma_\lambda G_\lambda$$

$T_{sample}(\lambda)$ refers to the transmission of the sample being tested as a function of the wavelength in per cent. The values for $G_\lambda$ come from the publication by Parry Moon mentioned earlier, page 604, Table III. A step size of 10 nm was used from 30 to 780 nm and a step size of 50 nm between 800 nm and 2100 nm, which was weighted appropriately.

The samples were then weathered for 500 h in accordance with SAE 1960 and the TLT and TSET values were subsequently determined. The results of these investigations are compiled in Table 3.

TABLE 3

TLT values and TSET values before and after 500 h weathering in accordance with SAE 1960

| No. | TLT (0 h) | TSET (0 h) | TLT (500 h) | TSET (500 h) |
|---|---|---|---|---|
| Example 1 | 80 | 62 | 78 | 61 |
| Example 2 | 80 | 60 | 78 | 59 |
| Example 3 | 78 | 64 | 75 | 63 |
| Example 4 | 65 | 63 | 62 | 61 |
| Example 5 | 79 | 60 | Not measured | Not measured |
| Example 6 | 69 | 53 | Not measured | Not measured |
| Comparative example 1 | 88 | 86 | Not measured | Not measured |
| Comparative example 3 | 76 | 70 | Not measured | Not measured |

As can be seen from table 3, the moulding compositions according to the invention with phthalocyanines and naphthalocyanines according to the invention (examples 1–4) have an improved TSET value compared with the prior art in comparative example 3 with a comparable TLT value. Compared with polycarbonate without NIR absorbers, the TLT value is only slightly lower, but the TSET value is considerably lower, i.e. moulding compositions are obtained which absorb a large part of the solar heat (TSET value) and yet transmit most of the visible light (TLT value).

Mixtures of naphthalocyanines and phthalocyanines are also particularly advantageous, as shown by the TLT and TSET values of examples 5 and 6.

It is clear from the results described that the moulding compositions described here have better optical properties than conventional NIR dyes with excellent light stability. At the same time, they are halogen-free, have no odour problems and undergo no degradation of the polycarbonate during processing, and are thus particularly well suited for glazing applications, as heat filters etc.

What is claimed is:

1. Moulding compositions containing a) a transparent thermoplastic polymer and b) 0.1 ppm to 1 wt. %, based on the mass of the transparent thermoplastic polymer, of a phthalocyanine of the general formula (I)

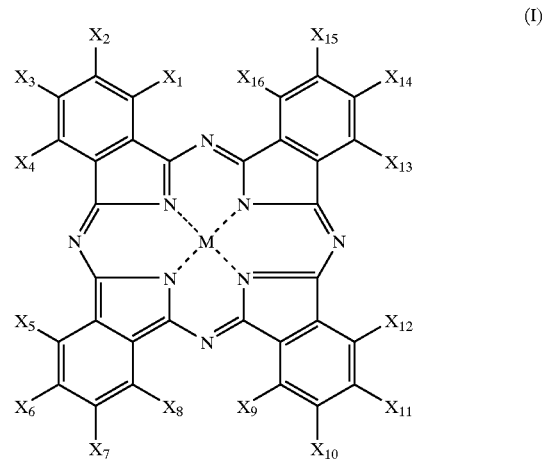

(I)

wherein

M is any atom or any compound and $X_1$ to $X_{16}$, independently of one another, are hydrogen, an aliphatic radical, an aromatic radical, an alkoxy radical or an aryloxy radical, wherein none of these radicals is to contain any N atoms, S atoms or halogen atoms and wherein at least one of the substituents $X_1$ to $X_{16}$ is not hydrogen.

2. Moulding compositions containing a) a transparent thermoplastic polymer and b) 0.1 ppm to 1 wt. %, based on the mass of the transparent thermoplastic polymer, of a naphthalocyanine of the general formula (II)

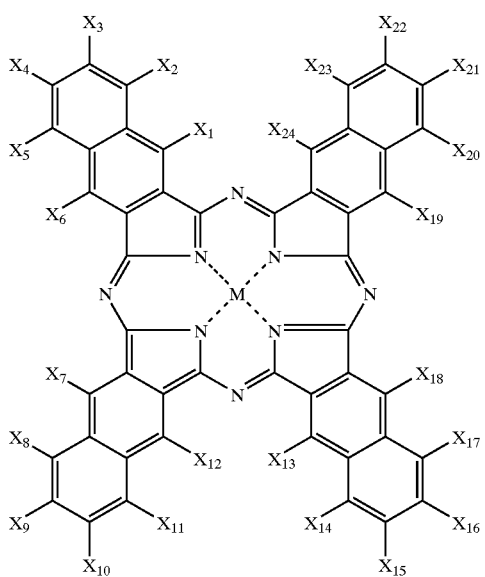

(II)

wherein

M is any atom or any compound and $X_1$ to $X_{24}$, independently of one another, are hydrogen, an aliphatic radical, an aromatic radical, an alkoxy radical or an aryloxy radical, wherein none of these radicals is to contain any N, S or halogen atoms and wherein at least one of the substituents $X_1$ to $X_{24}$ is not hydrogen.

3. Moulding compositions according to claim 1 wherein the transparent thermoplastic polymer is polycarbonate.

4. Process for the production of the moulding compositions according to claim 1 wherein the components of the moulding composition are mixed by an extruder and the transparent thermoplastic polymer is melted during mixing.

5. The molding composition according to claim 2 wherein the transparent thermoplastic polymer is polycarbonate.

6. A process for the production of the molding composition of claim 2 wherein the components of the composition are mixed in an extruder and the transparent thermoplastic polymer is melted during mixing.

7. A method of using the molding composition of claim 1 comprising producing glazing.

8. Glazing materials comprising the composition of claim 1.

9. Glazing materials comprising the composition of claim 2.

\* \* \* \* \*